(12) United States Patent
Ehrman

(10) Patent No.: US 6,263,493 B1
(45) Date of Patent: Jul. 17, 2001

(54) METHOD AND SYSTEM FOR CONTROLLING THE GENERATION OF PROGRAM STATEMENTS

(75) Inventor: John Robert Ehrman, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/111,850

(22) Filed: Jul. 8, 1998

(51) Int. Cl.[7] ........................................................ G06F 9/44
(52) U.S. Cl. .................................................................. 717/6
(58) Field of Search .................................... 717/5, 6, 2, 7

(56) References Cited

U.S. PATENT DOCUMENTS

| | | | |
|---|---|---|---|
| 4,553,205 | * 11/1985 | Porchia | 717/5 |
| 5,640,568 | * 6/1997 | Komatsu | 717/5 |
| 5,999,733 | * 12/1999 | Shamoto | 717/5 |

OTHER PUBLICATIONS

"Compilers Principles, Techniques and Tool" Alfred A. Aho et al. Chapters 1–7, Addison–Wesley Publishing Company, Sep. 12, 1985.*

"Vax Assembly Language and Architecture", Kapps et al. PWS Publishers pp. 126–128, 278–282, 1985.*

"Turbo Assembler 3.0 User's Guide", Borland Borland International Inc. Chapters 13–15, 1991.*

High Level Assembler for MVS & VM & VSE; Languatge Reference MVS and VM; Release 2 (Mar. 1995); (C) International Business Machines corporation 1982, 1995.

* cited by examiner

Primary Examiner—Mark Powell
Assistant Examiner—Todd Ingberg
(74) Attorney, Agent, or Firm—David W. Victor; Konrad Raynes & Victor

(57) ABSTRACT

Disclosed is a system for processing program statements, such as statements included in a macro. An assembler program is provided a plurality of statements with an input file. The assembler program processes the statements. For each statement the assembler program determines whether the processed statement is a buffering directive including a statement operand. If the assembler program determines that the processed statement is a buffering directive, the assembler program writes the statement operand of the buffering directive into a memory area. Otherwise, the assembler program generates the processed statement into a data stream. The assembler program generates the statements stored in the memory area into the data stream after processing the statements associated with the macro.

32 Claims, 3 Drawing Sheets

METHOD AND SYSTEM FOR CONTROLLING THE GENERATION OF PROGRAM STATEMENTS

BACKGROUND OF THE INVENTION

1. Field of the Invention

The present invention relates to a method for processing macro instructions and, in preferred embodiments, a method for altering the manner in which macro instructions are generated and processed by an assembler program.

2. Description of the Related Art

Assembly languages are the mixture of two distinct languages, ordinary assembly language and the conditional assembly and macro language. The ordinary assembly language is the language of the machine and assembler instruction statements that the assembler translates into machine language. The conditional assembly language is used primarily in macro instructions. Macro instructions are invoked during assembly to perform useful functions. The conditional assembly language consists of conditional statements, variable symbols, and macros that the assembler interprets and executes at assembly time to tailor, select, and create sequences of statements.

The conditional assembly language includes two classes of symbols, variable symbols and sequence symbols. Variable symbols are used for evaluation and substitution. Evaluation involves assigning values to variable symbols based on the results of computing expressions and substitution involves the assembler substituting the value of the variable symbol at instances of the variable symbol. The selection aspect of the conditional assembly language provides sequence symbols that alter the sequential flow of statement processing by the assembler.

A macro language provides a convenient way to automatically and repetitively generate a sequence of language statements in a single source program. Macros can be used, for example, in assembler languages to generate assembly language statements within a source program. The definition of a macro within a source program includes the name of the macro, variables used as points of substitution within the macro, and the sequence of language statements the assembler generates when the macro is called in the source program. A call to a macro using its defined name causes the assembler to generate the language statements included in the macro within the source program at the point where the call to the macro is made. If the macro includes variables, the assembler will interpret the variables and replace the variables with their values. The processing of a macro, also called macro expansion, consists of making logical decisions based on input arguments such as variables.

Macro processors employ three different mechanisms, text insertion, text parameterization, and text selection. In text insertion, the macro is used to generate a stream of characters to replace the string recognized in the macro call, i.e., inject one stream of source text into another. Text parameterization concerns the tailoring and adaptation of the generated stream to add parameters provided from the main program and other macro-calculated variables into the stream generated by the macro. Text selection concerns the ability to generate alternative streams of characters.

In current macro techniques, macro commands and model statements include fields in a standardized format. These standardized formats allow macro expansion to proceed with greater efficiency because arguments and internal variables are substituted directly into predetermined fields in the model statements. One limitation of this optimized encoding technique is that arbitrary forms of records cannot be created. Only those statements that comply with the predefined standard statement format can be used. For instance, a comment statement cannot be generated by substitution. Another limitation is that statements that could affect the assembler's analysis of the structure and content of a macro definition cannot be generated by substitution; this limitation encompasses almost all conditional assembly statements.

In prior art techniques, a nested macro call involves an outer macro making a call to an inner macro. When an inner macro is called within an outer macro, the processing of the outer macro is suspended (stacked) until the assembler completes processing the inner macro. A variable may be defined in an outer macro and passed through one or more levels of the nested inner macros and used therein. The processing of the inner macro may invoke further inner macros. Whenever an inner macro is called (invoked) the invoking macro is preserved (stacked) and the inner macro is processed. Only when the called innermost macro is completed does processing (expansion) of the outer or inner macro from which the most recently called inner macro is called resume. When the outermost macro of the expansion is completed, the assembler returns to processing the primary input stream.

With inner macro calls, the scanning and processing of the statements generated by one macro expansion must be completed before any statements generated by the calling macro(s) continues. Moreover, the order of statement generation is determined by the order of the nesting of the macro calls. The example (1) below shows macro definitions Mac_A and Mac_B, wherein Mac_A makes a call to Mac_B.

Example (1)

| | |
|---|---|
| Macro_Definition_Begin | |
| Mac_A   P1,P2 | Define Mac_A with parameters P1,P2 |
| - - - | Processing logic for Mac_A |
| Statements_A1 | Statements generated by Mac_A |
| Mac_B RRR,SSS | Nested Call on Mac_B |
| Statements_A2 | Statements generated by Mac_A |
| Macro_Definition_End | |
| Macro_Definition_Begin | |
| Mac_B P1,P2 | Define Mac_B with parameters P1,P2 |
| - - - | Processing logic for Mac_B |
| Statements_B | Statements generated by Mac_B |
| Macro_Definition_End | |

When Mac_A is called, Mac_A generates the statements in the following order:

| | |
|---|---|
| Statements_A1 | Statements generated by Mac_A |
| Statements_B | Statements generated by Mac_B |
| Statements_A2 | Statements generated by Mac_A |

With the current nested call technique for generating macro statements, statements are generated in an order that matches the nesting of the calls. There is no mechanism for providing further controls over the sequence of generated statements. Thus, although the outer (calling) macro can pass variables and arguments into the inner (called) macro, the outer macro cannot interact with the called macros to alter the sequence of statements generated therein.

A nested definition occurs when a macro is defined within another macro, referred to as the enclosing macro. Thus, the process of generating the statements of the enclosing macro involves generating the statements of a macro definition. After generating the macro definition, the defined macro may be called and expanded as discussed above. The process of generating the outer macro encodes the defined inner macro. Example (2) below shows enclosing macro Mac_F including a nested definition of macro Mac_G.

| Example (2) | |
|---|---|
| Macro_Definition_Begin | |
| Mac_F P1,P2 | Define Mac_F with parameters P1,P2 |
| --- | Processing logic for Mac_F |
| Statements_F1 | Statements generated by Mac_F |
| Macro_Definition_Begin | |
| Mac_G P1,P2 | Define Mac_G with parameters P1,P2 |
| --- | Processing logic for Mac_G |
| Statements_G | Statements generated by Mac_G |
| Marco_Definition_End | |
| --- | Processing logic for Mac_F |
| Statements_F2 | Statements generated by Mac_F |
| Macro_Definition_End | |

A call on macro Mac_F will generate the statements of the nested definition of Mac_G. If the enclosing macro is called a second time, then the assembler generates a second definition, identical to the first, which replaces the previously generated nested definition. Nested definitions of macros may also be included within nested definitions. As discussed, a nested definition will not be generated until the enclosing macro, which may itself be a nested definition, is invoked. Only after the enclosing macro is called will the nested macro definition be generated, encoded and available for subsequent calls to the generated nested definition.

One limitation of the nested definition technique is that all statements of the inner macro definition are shielded from actions of the enclosing macro. This means that variables defined and used within an inner macro definition cannot be manipulated within the outer macro using the standard techniques of parameterization and selection. The expansion and interpretation of variables and other statements within the inner macro is not affected by the operations or variables used in the outer macro. The outer macro will not have an opportunity to parameterize or manipulate statements or variables set within the inner macro while the inner macro is processed. Moreover, macros containing nested definitions cannot generate partial nested definitions. Nested definitions must be completely generated within the outer macro. This is because the start and end of a macro definition must be matched within each macro; otherwise, the macro processor cannot determine whether or not a macro coding error has occurred. A further limitation of prior art macro processing techniques is that an enclosing macro can only generate a single instance of that definition because generating the definition multiple times results in the assembler's replacing the previous definition with a new definition that is identical to the previously generated definition.

Moreover, the processing within one inner macro cannot effect the processing and operations of another inner macro using the same parameters. Thus, a call to an inner macro cannot set a parameter to a value and pass such values to a subsequent inner macro call. Thus, the shielding effect of macro processing techniques applies to interaction between inner macros as well as interaction between inner and outer macros.

Thus, with prior art macro generation techniques the sequencing of statement generation from macro expansions and nested calls is predetermined. Prior art macros cannot be used to defer the processing of statements or provide a different ordering in the processing of generated statements. Further, the assembler forbids creation by substitution of a large class of statement types. For instance, macros cannot generate macro definitions that have been tailored and/or parameterized in any way. Still further, statements generated during macro expansion must have a fixed and predetermined format that cannot be altered.

SUMMARY OF THE PREFERRED EMBODIMENTS

To address the shortcomings of current macro processing techniques, preferred embodiments of the present invention disclose a method of processing program statements. An assembler program is provided a plurality of statements and processes the statements in the macro. For each statement the assembler program determines whether the processed statement is a buffering directive including a statement operand. If the assembler program determines that the processed statement is a buffering directive, the assembler program writes the statement operand of the buffering directive into a memory area. Otherwise, the assembler program generates the processed statement into a data stream. The assembler program generates the statements stored in the memory area into the data stream after processing the statements.

In further embodiments, the plurality of statements are associated with a macro and the statements comprise a macro call. The assembler program processes the macro call and provides a definition of the called macro including the plurality of statements.

In yet further embodiments, the plurality of statements associated with the macro comprises a definition of the macro comprising a plurality of statements, wherein the assembler program processes the statements associated with the macro in an order in which the statements were generated into the data stream.

Preferred embodiments allow users to alter the order of recognition and processing of generated statements. Moreover, statements can be constructed in any arbitrary format, without being restricted to the formats required by the assembler's pre-determined statement format. Still further, with preferred embodiments, nested macro definitions may be tailored in arbitrary ways, allowing (for example) a single "master" macro to generate many different macro definitions. Moreover, with preferred embodiments, statements may be created by substitution that would not be allowed with current macro processing technology.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Hardware Environment

Figure 1:
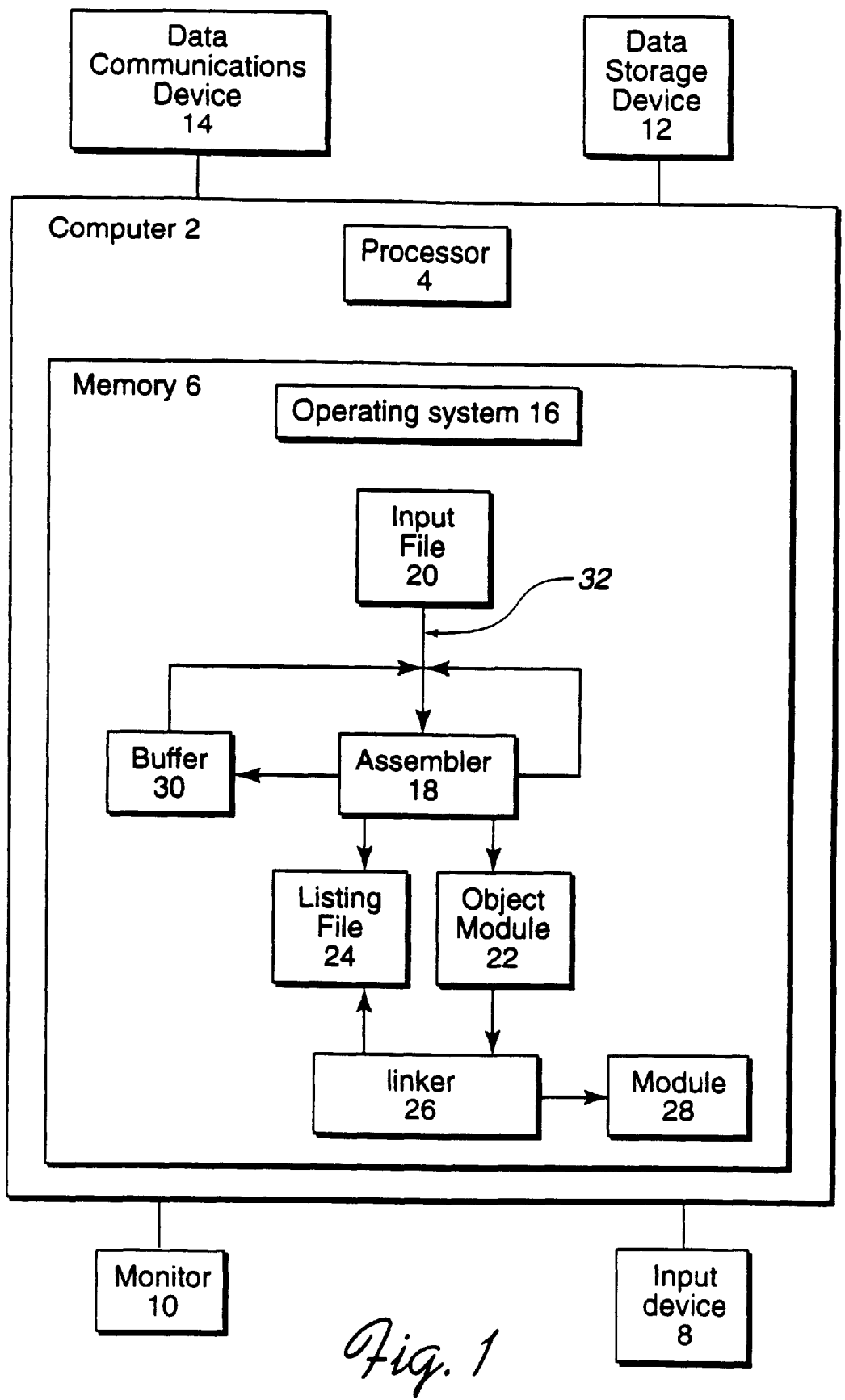
FIG. 1 is an exemplary hardware environment used to implement the preferred embodiment of the invention.

FIG. 1 is a block diagram illustrating an exemplary hardware environment used to implement the preferred embodiments of the present invention. In the exemplary hardware environment, a computer 2 may include, inter alia, a processor 4, memory 6 (e.g., random access memory (RAM), DRAM, SDRAM, etc.), an input device 8 (e.g., data file, keyboard, mouse pointing device, touch sensitive display, voice activated input device, etc.), monitor 10 (e.g., data file, CRT, LCD displays, etc.), as well as a data storage device 12 (e.g., hard disk, floppy disk, optical disk, CD-ROM, etc.), and a data communication device 14 (e.g. modems, network interfaces, etc.). In alternative embodiments other devices may be attached to the computer 2, such as a read only memory (ROM), a video card, bus interface, printers, etc. Those skilled in the art will recognize that any combination of the above components, or any number of different components, peripherals, and other devices known in the art, may be used with the computer 2.

The computer 2 operates under the control of an operating system (OS) 16, such as AIX®, OS/390198, UNIX®, OS/2®, MVSTM, WINDOWS™, etc. AIX and OS/2 are registered trademarks of International Business Machines Corporation (IBM); OS/390 and MVS are trademarks of IBM; WINDOWS is a registered trademark of Microsoft Corporation; UNIX is a registered trademark licensed by the X/Open Company LTD. The operating system 16 is loaded into the memory 6 of the computer 2 for execution when the computer 2 is powered-on or reset. In turn, the operating system 16 controls the execution of one or more computer programs, including an assembler 18. The assembler 18 may be the IBM High Level Assembler Program. A description of the IBM High Level Assembler language is found in the IBM publications "High Level Assembler for MVS & VM & VSE: Language Reference MVS & VM, Release 2", IBM document no. SC26-4940-01 (IBM Copyright, 1982, 1995); "High Level Assembler for MVS & VM & VSE: Programmer's Guide MVS & VM Edition, Release 2," IBM document no. SC26-4941-01 (IBM Copyright, 1982, 1995), which publications are incorporated herein by reference in their entirety. Additional logic is implemented in the assembler 18 to perform the logic of the preferred embodiments.

The assembler 18 reads an input file 20, which in preferred embodiments is a source module composed of source statements in the assembler language. The assembler 18 translates the symbolic assembler statements into machine language, assigns storage locations to instructions and other elements of the program, and stores such translated assembler statements in an object module 20. The assembler 18 may also produce a listings file 24, which provides a copy of all statements in the input file 20 exactly as they are entered into the assembler 18. The listing file 24 is used for diagnostic purposes to check that branches and data references are in order and that macro instructions have been expanded properly. A linker or binder 26 receives the object module 20 and produces a load module 28 which can be loaded into the main memory of the computer 2 for execution.

Also included is a buffer 30 which is a portion of the memory 6. The buffer 30 receives statements from the assembler 18 and later puts them back into an input stream 32 in the manner described below. The present invention is generally implemented in the assembler 18, which executes under the control of the operating system 16 and causes the computer 2 to perform the desired functions of the preferred embodiments described herein.

The operating system 16, input file 20, assembler 18, object module 22, linker 26, and module 28 are all comprised of instructions which, when read and executed by the computer 2, cause the computer 2 to perform the steps necessary to implement and/or use the present invention. Generally, the operating system 16, input file 20, assembler 18, object module 22, linker 26, and module 28 are all tangibly embodied in and/or readable from a device, carrier or media, such as memory 6, data storage device 12, and/or data communications device 14. Under control of the operating system 14, the programs 16, 18, 20, 22, 24, 26, and 28 may be loaded from memory 6, data storage device 12 and/or data communications device 14 into the memory 6 of the computer 2 for use during actual operations.

In processing a macro instruction during conditional assembly, the assembler 18 receives the input file 20 from an input stream 32. The assembler 18 passes the statements generated in the input file 20 not processed during conditional assembly and statements generated during conditional assembly immediately back to the input stream 32 in the order received and generated. When the assembler 18 processes a call to a macro, the assembler suspends all processing of the input file and then expands the macro at the position where the call to the macro was made. While processing the macro, the assembler generates and interprets the statements and immediately passes the statements back to the input stream 32 before continuing the processing of the input file 20. During assembly time, the assembler 18 processes statements placed back into the input stream 32 during conditional assembly.

Thus, the present invention may be implemented as a method, apparatus or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments and programs may be used without departing from the scope of the present invention.

The Macro Assembler

Preferred embodiments of the present invention include an assembly language instruction, referred to as the "buffering instruction," which causes the assembler 18 to alter the sequence in which macro statements are generated. The buffering instruction places statements in the operand portion of the buffering instruction either into the normal macro output stream for immediate processing or places them into the buffer 30 and defers the generation and interpretation of the buffered statements until the outermost macro call and any nested macro calls in which the buffering statements may appear are completed. This buffering defers the interpretation of the buffered statements until the entire nest of macro calls including any buffering instructions has been expanded. After the outermost called macro is expanded, the assembler 18 would generate the buffered macro statements back into the input stream to the assembler 18 and subsequently resume reading records from the primary input file 20. In preferred embodiments, the buffering instruction generates the buffered statements back into the input stream 32 on a first-in-first-out basis (FIFO) of when the statements were generated into the buffer 30.

In preferred embodiments, the buffering instruction may include operands, such as FRONT and BACK, that specify whether the buffered statements should be placed before (FRONT) or after (BACK) existing statements in the buffer 30. Statements at the front of the buffer 30 are read out first and statements placed at the back are read out last after the outermost macro has been expanded. If neither FRONT or BACK is specified and the buffer 30 maintains data on a FIFO basis, then the default value of FRONT and BACK for the buffering statement would be BACK.

Processing Macros Using the Buffering Instruction

Figures 2, 2A:
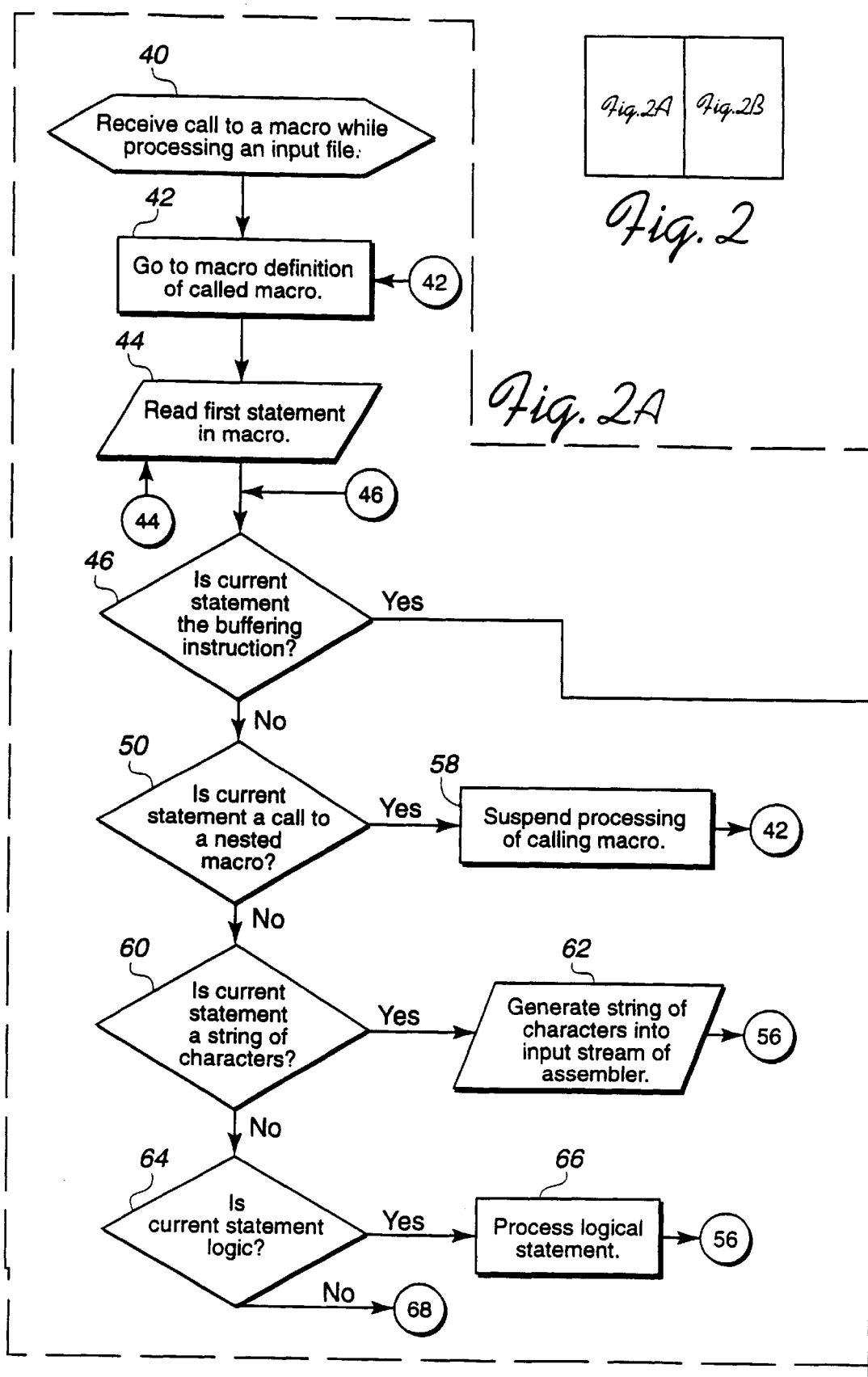
FIG. 2 is a flowchart illustrating how macros are processed in accordance with preferred embodiments of the present invention.
Figure 2B:
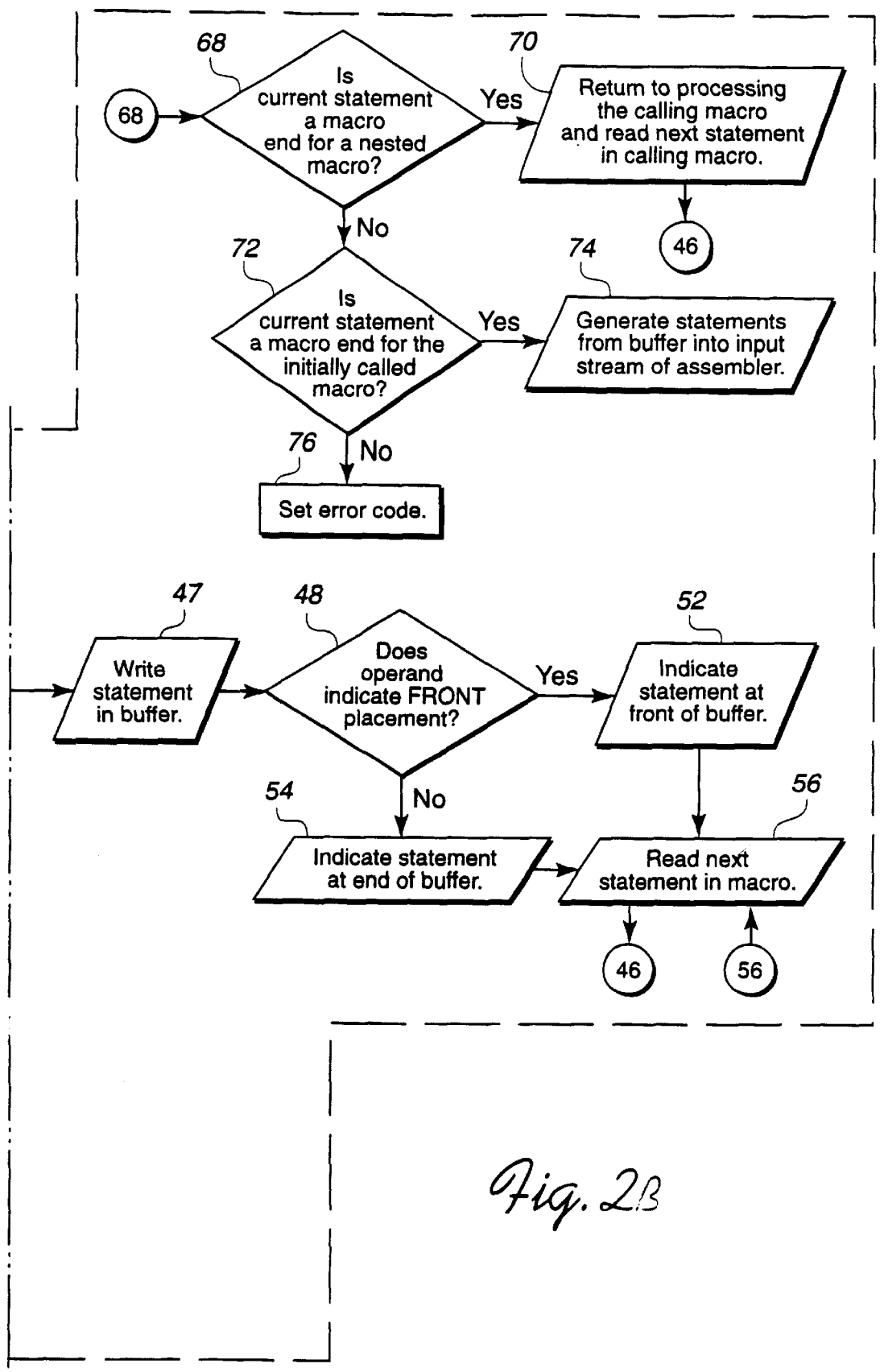

FIG. 2 illustrates logic implemented in the assembler 18, or the conditional assembly portion of the assembler 18, for processing macros including buffering instructions in accordance with preferred embodiments of the present invention. Logic begins at block 40 which represents the assembler 18 processing a call to a macro while processing an input file. Control transfers to block 42 which represents the assembler 18 going to the encoded macro definition of the called macro previously generated into the input stream 32 of the assembler 18. This macro is the outermost macro. Control transfers to block 44 which represents the assembler 18 reading the first statement in the macro. The statement may be any type of statement, including a string of characters, a variable or any other type of expression or command. Control then transfers to block 46 which represents the assembler 18 determining whether the statement is the buffering instruction. If so, control transfers to block 47; otherwise, control transfers to block 50.

Block 47 represents the assembler 18 writing the statement into the buffer 30. The statement written into the buffer 30 as a result of processing the buffering instruction may be any type of expression or statement, including logic, a command, a qualitative command, a primitive, a string of characters, a variable, etc. Control then transfers to block 48 which represents the assembler 18 determining whether the placement operand of the buffering instruction indicates FRONT placement. If placement is FRONT, control transfers to block 52 which represents the assembler indicating that the statement written into the buffer 30 is at the front of the buffer 30. Otherwise, control transfers to block 54 which represents the assembler 18 indicating the statement is at the end of the buffer 30. If data is read out from the buffer 30 on a FIFO basis, then statements at the front are read out into the input stream of the assembler 18 first; while those at the back are read out last. From blocks 52 and 54, control transfers to block 56 which represents the assembler 18 reading the next statement in the macro. After reading the next statement, control transfers back to block 46 et seq. to take action on the next statement. If the statement is not the buffering instruction, control transfers to block 50 which represents the assembler 18 determining whether the current statement is a call to a nested macro. If so, control transfers to block 58 which represents the assembler 18 suspending processing of the calling macro, which may be the outermost macro or a previously called nested macro. After suspending processing, control transfers to block 42 et seq. to read the encoded definition of the just called macro.

If the current statement is not a call to a nested macro, at block 60, the assembler 18 determines whether the current statement is a string of characters. If so, control transfers to block 62 which represents the assembler 18 generating the statement string of characters into the input stream 32 of the assembler 18. Control then transfers to block 56 et seq. to proceed to the next statement in the macro. If the current statement is not a string of characters, then control transfers to block 64 which represents the assembler 18 determining whether the statement is an expression or macro command or logic. If so, control transfers to block 66 to process the logic and then to block 56 et seq. to process the next statement in the macro. If the current statement is not logic, then control transfers to block 68 which represents the assembler 18 determining whether the current statement is a macro_end indicator for indicating the end of a nested macro. If so, control transfers to block 70 which represents the assembler 18 returning to process the calling macro, which may be the outermost macro or another nested macro, and reading the next statement from the macro for which processing was resumed. Control then proceeds back to block 46 et seq. to process this next statement.

If the current statement is not the end macro indicator for a nested macro, then at block 72, the assembler 18 determines whether the current statement indicates the end of the outermost macro. If so, control transfers to block 74 to generate the buffered statements into the input stream 32 of the assembler 18. As discussed, statements buffered in the buffer 30 may be generated out into the input stream 32 on a FIFO basis or according to any other ordering scheme known in the art. If the current statement is not the end of the outermost macro, then at block 76, the assembler 18 sets an error code as the current statement is not recognizable.

With the preferred embodiments, the buffering instruction alters the sequence in which statements are generated into the input stream of the assembler 18 when macros are processed during conditional assembly.

Examples of How the Buffering Instruction Alters Macro Processing

In the examples below, the buffering instruction is referred to as the AWRITE statement. Example (3) below provides the definition of a macro Mac_AA including the AWRITE command to buffer statements and a nested call to Mac_B. This macro Mac_AA is identical to the Mac_A of Example (1) except for the use of the AWRITE command to buffer certain statements.

| Example (3) | |
|---|---|
| Macro_Definition_Begin | |
| Mac_AA P1,P2 | Define Mac_A with parameters P1,P2 |
| - - - | Processing logic for Mac_AA |
| AWRITE 'Statements_A1' | Statements buffered by Mac_AA |
| Mac_B RRR,SSS | Nested Call on Mac_B |
| Statements_A2 | Statements generated by Mac_AA |
| Macro_Definition_End | |
| Macro_Definition_Begin | |
| Mac_B P1,P2 | Define Mac_B with parameters P1,P2 |
| - - - | Processing logic for Mac_B |
| Statements_B | Statements generated by Mac_B |
| Macro_Definition_End | |

When Mac_AA is called, the assembler 18 buffers the statement A1. Statements A2 and B are not buffered and, instead, written into the input stream 32 before the buffered statements are generated back into the input stream 32. B is generated into the input stream 32 before A2. After reaching the end of the macro Mac_AA, the buffered statement is read out. Thus, the order of generating statements in Example (3) is B, A2, and A1. This is different than the order generated from the macro Mac__A in Example (1). The logic statements (indicated by the characters '— — —') represent any statement type.

In the above example (3), if both statements A1 and A2 were buffered, then the order of generating the statements will be B, A1, and A2, assuming statements are read out on a FIFO basis. Alternatively, if all statements A1, A2, and B were buffered with the AWRITE command, reading out the statements on a FIFO basis would produce the ordering of A1, B, and A2. As discussed, a placement operand may be provided with the AWRITE (buffering instruction) to indicate where in the buffer 30 to place the statement, i.e., back or front. By selecting front or back operands any desired processing ordering can be selected.

The preferred embodiment buffering instruction (AWRITE) can also be used to generate arbitrary forms of records, such as macros having different names and definitions. This is illustrated below in Example (4).

Example (4)

| | |
|---|---|
| Macro__Definition__Begin | |
| Mac__Gen &Param__List | Define Mac__Gen with parameter list |
| &Arg# SetA 1 | Set argument counter to 1 |
| .Loop ANop , | Define looping point |
| &Name SetA '&Param__List'(&Arg#) | Select an argument from &Param__List |
| AWRITE'Macro_definition_Begin' | Buffered macro header |
| AWRITE'&Name P1,P2' | Buffered macro prototype |
| AWRITE'- - -' | Processing logic statements |
| AWRITE'Macro__Definition__End' | Buffered macro trailer |
| &Arg# SetA &Arg#+1 | Increment argument counter |
| AIF (&Arg# LE N'&Param__List).Loop | Go back if more arguments |
| Macro__Definition__End | |

The macro of Example (4) has two variables, a counter &Arg# and &Name. The Mac__Gen macro of example (4) receives parameters. For the number of parameters in the parameter list, the assembler 18 performs the steps in the loop until the &Arg# variable equals the number of parameters in the list, thereby generating the statements within the loop for each provided parameter. For each time the loop is executed for a parameter, a macro having the name of the parameter and other buffered statements is generated.

For instance, if Mac__Gen PP,QQ is called, then the buffered statements are:

```
Macro__Definition__Begin
PP   P1,P2
- - -            Processing logic statements
Macro__Definition__End
Macro__Definition__Begin
QQ   P1,P2
- - -            Processing logic statements
Macro__Definition__End
```

The assembler 18 processes the buffered statements to create two distinct macro definitions named PP and QQ. The generating macro Mac__Gen could also include its own logic statements that cause different logic statements to be generated for each of the buffered macro definitions. In this way, preferred embodiments are used to generate multiple macros that differ by choices controlled by the value of a single variable.

Accordingly, preferred embodiments provide a mechanism to enhance macro processing. Certain statements that need to be parameterized may be buffered by the preferred embodiment AWRITE instruction in buffer 30 and processed after the outermost macro has completed processing. With the preferred embodiments, statements that would normally be isolated within an inner macro may now be generated, parameterized and manipulated.

Conclusion

This concludes the description of the preferred embodiment of the invention. The following describes some alternative embodiments for accomplishing the present invention.

Preferred embodiments for buffering and generating statements were described with respect to macro statements. In alternative embodiments, the buffering and generating features of the preferred embodiments could be applied to any type of program statement, including character strings, variables, expressions, commands, etc.

Any type of computer, such as a mainframe, minicomputer, work station or personal computer, could be used with the present invention. In addition, any interpreter, compiler, assembler or other program utilizing macros to generate language statements could benefit from the present invention. Although certain examples were described with respect to the preferred embodiment instruction referred to as AWRITE, those skilled in the art will appreciate that other naming conventions could be used for the preferred embodiment instruction.

Still further, certain actions were described as taking place during conditional assembly and others described as taking place during a subsequent assembly time. However, those skilled in the art will appreciate that in alternative embodiments assembly time processing of statements can occur during conditional assembly, and vice versa, to optimize the processing of the input file.

Moreover, the above examples of the AWRITE command were included in a macro. However, the AWRITE command can be used in an input file 20 outside of a macro and may be used to buffer statements anywhere in the input file 20. Still further, the AWRITE command can generate arbitrary statements not requiring predetermined fields.

Preferred embodiments described above include separate programs for assembling, linking (binding), and loading. However, it should be appreciated that in alternative embodiments the functions performed by these separate program categories may be grouped in one or more programs in a manner different from the grouping of functions discussed above.

In described embodiments, statements were not generated from the buffer to the input stream until the outermost macro completed processing. In alternative embodiments, statements may be generated from the buffer to the input stream before processing of the outermost macro has completed. Moreover, statements may be generated out from the buffer at different instances during macro processing.

In summary, preferred embodiments disclose a method of processing statements included in a macro. An assembler program is provided a plurality of program statements to process. For each statement, the assembler program determines whether the processed statement is a buffering directive including a statement operand. If the assembler program determines that the processed statement is a buffering directive, then the assembler program writes the statement operand of the buffering directive into a memory area.

Otherwise, the assembler program generates the processed statement into a data stream. The assembler program generates the statements stored in the memory area into the data stream after processing.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of generating statements in a program, comprising:
   (a) providing a plurality of statements;
   (b) processing the statements by performing, for each statement:
      (i) determining whether the processed statement is a buffering directive including a statement operand, wherein the buffering directive comprises an instruction to buffer the statement operand into a memory area to alter an order in which the statements are processed;
      (ii) writing the statement operand of the buffering directive into the memory area after determining that the processed statement is a buffering directive; and
      (iii) generating the processed statement into a data stream after determining that the processed statement is not a buffering directive; and
   (c) generating the statements stored in the memory area into the data stream after generating the plurality of statements that are not buffering directives into the data stream.

2. The method of claim 1, wherein the generated data stream is an input data stream to the assembler program.

3. The method of claim 1, wherein the statements are part of a macro.

4. The method of claim 3, wherein the step of providing the plurality of statements associated with the macro comprises processing a definition of the macro comprising a plurality of statements, wherein a call to the macro provides the statements associated with the macro in an order in which the statements were generated into the data stream.

5. The method of claim 3, wherein the statements include a loop enclosing a plurality of buffering directives and statement operands, wherein at least one of the statement operands in the loop is a variable, further comprising the step of providing a plurality of string parameters, wherein the step of processing the statements is repeated for each provided parameter, wherein the step of processing the statements further comprises processing the statements enclosed in the loop for each provided parameter by performing the steps of:
   determining whether the operand statement is a variable expression;
   substituting one of the parameters for the variable expression after determining that the operand statement is a variable expression, wherein the step of writing the statement operand into the memory area comprises writing the substituted parameter into the memory area; and
   writing the statement operand of the buffering directive into the memory area after determining that the operand statement is not a variable expression.

6. The method of claim 3, wherein the step of providing a plurality of statements associated with the macro comprises the steps of processing a call to the macro and providing a definition of the called macro including a plurality of statements.

7. The method of claim 6, wherein the called macro is a first macro, wherein the step of processing each statement further comprises the steps of:
   processing a call to a second macro;
   suspending the processing of the statements in the first macro;
   processing the statements in the second macro by performing, for each statement, the steps of:
      (i) determining whether the processed statement is a buffering directive including a statement operand;
      (ii) writing the statement operand of the buffering directive into a memory area after determining that the processed statement is a buffering directive; and
      (iii) generating the processed statement into a data stream after determining that the processed statement is not a buffering directive; and
   resuming the processing of the statements in the first macro after processing all the statements in the second macro, wherein the step of generating the statements into the data stream comprises generating the statements from the first and second macros stored in the memory area into the data stream after processing statements included in the first macro.

8. The method of claim 1, wherein the step of processing the statements comprises sequentially processing the statements and wherein the step of generating the statements stored in the memory comprises generating the statements stored in the memory on a first-in-first-out (FIFO) ordering.

9. The method of claim 1, wherein the buffering directive further includes an order operand, wherein the order operand affects the order of generating the statements stored in the memory area into the data stream.

10. The method of claim 9, wherein the order operand is one of a first string and a second string, further comprising the steps of:
   processing the first string to indicate that the statement operand written in the memory area is to be generated into the data stream before statements that were in the memory area when the statement operand was written into the memory area; and
   processing the second string to indicate that the statement operand written in the memory area is to be generated into the data stream after statements that were in the memory area when the statement operand was written into the memory area.

11. A computer programming apparatus, comprising:
   (a) a computer having a memory;
   (b) an assembler computer program loaded into the memory and executed by the computer;
   (c) program logic executed by the assembler program, including:
      (i) means for providing a plurality of statements;
      (ii) mean for determining, for each statement, whether the processed statement is a buffering directive including a statement operand, wherein the buffering directive comprises an instruction to buffer the statement operand into a memory area to alter an order in which the statements are processed;

(iii) means for writing the statement operand of the buffering directive into a memory area after determining that the processed statement is a buffering directive;

(iv) means for generating the processed statement into a data stream after determining that the processed statement is not a buffering directive; and (v) means for generating the statements stored in the memory area into the data stream after generating the plurality of statements that are not buffering directives into the data stream.

12. The apparatus of claim 11, wherein the generated data stream is an input data stream to the assembler program.

13. The apparatus of claim 11, wherein the statements are part of a macro.

14. The apparatus of claim 13, wherein the means for providing the plurality of statements associated with the macro comprises means for processing a definition of the macro comprising a plurality of statements, wherein a call to the macro provides the statements associated with the macro in an order in which the statements were generated into the data stream.

15. The apparatus of claim 13, wherein the means for providing a plurality of statements associated with the macro comprises means for processing a call to the macro and providing a definition of the called macro including a plurality of statements.

16. The apparatus of claim 15, wherein the called macro is a first macro, wherein the means for processing each statement further comprises:

means for processing a call to a second macro associated with a plurality of statements, wherein the means for processing the statements in the macro is capable of processing the statements in the second macro; and means for resuming the processing of the statements in the first macro after processing all the statements in the second macro, wherein the means for generating the statements into the data stream comprises generating the statements from the first and second macro stored in the memory area into the data stream after processing all the statements included in the first macro.

17. The apparatus of claim 11, wherein the buffering directive further includes an order operand, wherein the order operand affects the order of generating the statements stored in the memory area into the data stream.

18. The apparatus of claim 17, wherein the order operand is one of a first string and a second string, wherein the program logic executed by the assembler program further comprises:

means for processing the first string to indicate that the statement operand written in the memory area is to be generated into the data stream before statements that were in the memory area when the statement operand was written into the memory area; and means for processing the second string to indicate that the statement operand written in the memory area is to be generated into the data stream after statements that were in the memory area when the statement operand was written into the memory area.

19. An article of manufacture for use in programming a computer to process statements in an input file, the article of manufacture comprising a computer readable storage medium having at least one computer program embodied therein that causes the computer to perform:

(a) providing a plurality of statements;

(b) processing the statements in the macro by performing, for each statement, the steps of:

(i) determining whether the processed statement is a buffering directive including a statement operand, wherein the buffering directive comprises an instruction to buffer the statement operand into a memory area to alter an order in which the statements are processed;

(ii) writing the statement operand of the buffering directive into a memory area after determining that the processed statement is a buffering directive; and (iii) generating the processed statement into a data stream after determining that the processed statement is not a buffering directive; and (c) generating the statements stored in the memory area into the data stream after generating the plurality of statements that are not buffering directives into the data stream.

20. The article of manufacture of claim 19, wherein the generated data stream is an input data stream to an assembler program.

21. The article of manufacture of claim 19, wherein the statements are part of a macro.

22. The article of manufacture of claim 21, wherein the step of providing the plurality of statements associated with the macro comprises processing a definition of the macro comprising a plurality of statements, wherein a call to the macro provides the statements associated with the macro in an order in which the statements were generated into the data stream.

23. The article of manufacture of claim 21, wherein the statements include a loop enclosing a plurality of buffering directives and statement operands, wherein at least one of the statement operands in the loop is a variable, further comprising the step of providing a plurality of string parameters, wherein the step of processing the statements is repeated for each provided parameter, wherein the step of processing the statements further comprises processing the statements enclosed in the loop for each provided parameter by performing the steps of:

determining whether the operand statement is a variable expression;

substituting one of the parameters for the variable expression after determining that the operand statement is a variable expression, wherein the step of writing the statement operand into the memory area comprises writing the substituted parameter into the memory area; and writing the statement operand of the buffering directive into a memory area after determining that the operand statement is not a variable expression.

24. The article of manufacture of claim 21, wherein the step of providing a plurality of statements associated with the macro comprises the steps of processing a call to the macro and providing a definition of the called macro including a plurality of statements.

25. The article of manufacture of claim 24, wherein the called macro is a first macro, wherein the step of processing each statement further comprises the steps of:

processing a call to a second macro;

suspending the processing of the statements in the first macro;

processing the statements in the second macro by performing, for each statement, the steps of:

(i) determining whether the processed statement is a buffering directive including a statement operand;

(ii) writing the statement operand of the buffering directive into a memory area after determining that the processed statement is a buffering directive; and (iii) generating the processed statement into a data stream after determining that the processed statement is not a buffering directive; and resuming the processing of the statements in the first macro after processing all the statements in the second macro, wherein the step of generating the statements into the data stream comprises generating the statements from the first and second macro stored in the memory area into the data stream after processing the statements included in the first macro.

26. The article of manufacture of claim 19, wherein the step of processing the statements comprises sequentially processing the statements and wherein the step of generating the statements stored in the memory comprises generating the statements stored in the memory on a first-in-first-out (FIFO) ordering.

27. The article of manufacture of claim 19, wherein the buffering directive further includes an order operand, wherein the order operand affects the order of generating the statements stored in the memory area into the data stream.

28. The article of manufacture of claim 27, wherein the order operand is one of a first string and a second string, further comprising the steps of:

processing the first string to indicate that the statement operand written in the memory area is to be generated into the data stream before statements that were in the memory area when the statement operand was written into the memory area; and processing the second string to indicate that the statement operand written in the memory area is to be generated into the data stream after statements that were in the memory area when the statement operand was written into the memory area.

29. A memory device storing data accessible to a computer program executing on a computer, the data comprising:

an input file, wherein the computer program processes the contents of the input file;

a macro comprised of a plurality of statements, wherein the computer program processes the macro statements to determine whether the statement is a buffering directive including a statement operand, wherein the buffering directive comprises an instruction to buffer the statement operand into a memory area to alter an order in which the statements are processed, wherein the computer program writes the statement operand of the buffering directive into a memory area after determining that the processed statement is a buffering directive; and a data stream, wherein the computer program generates the processed statement into the data stream after determining that the processed statement is not a buffering directive, and wherein the computer program generates the statements stored in the memory area into the data stream after generating the plurality of statements that are not buffering directives into the data stream.

30. The memory device of claim 29, wherein the generated data stream is an input data stream to the computer program.

31. The memory device of claim 29, wherein the buffering directive further includes an order operand, wherein the computer program processes the order operand to determine the order of generating the statements stored in the memory area into the data stream.

32. The memory device of claim 31, wherein the order operand is one of a first string and a second string, wherein the computer program processes the first string to indicate that the statement operand written in the memory area is to be generated into the data stream before statements that were in the memory area when the statement operand was written into the memory area, and wherein the computer program processes the second string to indicate that the statement operand written in the memory area is to be generated into the data stream after statements that were in the memory area when the statement operand was written into the memory area.

* * * * *